US010013570B2

(12) United States Patent
Hernandez Gonzalez et al.

(10) Patent No.: US 10,013,570 B2
(45) Date of Patent: Jul. 3, 2018

(54) DATA MANAGEMENT FOR A MASS STORAGE DEVICE

(71) Applicant: International Business Machines Corporation, Armonk, NY (US)

(72) Inventors: Guillermo Hernandez Gonzalez, Tlajomulco de Zuniga (MX); Paul Llamas Virgen, Ciudad Guzmán (MX); Humberto Orozco Cervantes, Tonalá (MX)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 15/149,698

(22) Filed: May 9, 2016

(65) Prior Publication Data

US 2017/0323111 A1 Nov. 9, 2017

(51) Int. Cl.
*H04L 29/06* (2006.01)
*G06F 21/62* (2013.01)

(52) U.S. Cl.
CPC .......... *G06F 21/6218* (2013.01); *H04L 63/10* (2013.01)

(58) Field of Classification Search
CPC ......... G06F 2221/2107; G06F 21/6218; G06F 21/31; G06F 3/0601; G06F 3/0659; G07F 7/1008
See application file for complete search history.

(56) References Cited

U.S. PATENT DOCUMENTS

| | | | |
|---|---|---|---|
| 6,968,459 B1 | 11/2005 | Morgan et al. | |
| 8,861,723 B2 | 10/2014 | Kambayashi et al. | |
| 8,910,301 B2 | 12/2014 | Wang et al. | |
| 9,336,402 B2* | 5/2016 | Wong | G06F 21/62 |
| 9,825,932 B2* | 11/2017 | Ponsford | H04L 63/0807 |
| 2002/0059309 A1* | 5/2002 | Loy | G06F 9/542 |
| 2004/0151312 A1 | 8/2004 | Yanagisawa | |
| 2005/0033959 A1 | 2/2005 | Zheng et al. | |
| 2010/0036860 A1* | 2/2010 | Hiura | G06F 17/2247 707/634 |
| 2011/0173377 A1* | 7/2011 | Bonica | G06F 21/79 711/103 |

(Continued)

OTHER PUBLICATIONS

Poonguzhali P. et al., "Secure Storage of Data on Android Based Devices"; IJET 2016 vol. 8(3): 177-182 ISSN: 1793-8236 DOI: 10.7763/IJET.2016.V8.880; <http://www.ijetch.org/vol8/880-ST011.pdf>; Jun. 2016.

(Continued)

*Primary Examiner* — Ali Abyaneh
(74) *Attorney, Agent, or Firm* — Peter J. Edwards

(57) ABSTRACT

Disclosed aspects relate to data management for a mass storage device. The mass storage device may be structured to include an encrypted file system to store a set of data and a token analyzer to manage access to the encrypted file system. A connection between the mass storage device and a computing device may be sensed. In response to sensing the connection, a token corresponding with the computing device may be detected. Based on the token, the token analyzer may determine to provide the computing device a set of selected permissions to the encrypted file system. The set of selected permissions to the encrypted file system may be provided by the mass storage device to the computing device.

19 Claims, 6 Drawing Sheets

(56) References Cited

U.S. PATENT DOCUMENTS

| | | | |
|---|---|---|---|
| 2011/0296194 A1* | 12/2011 | Herkes | G06F 21/34 |
| | | | 713/185 |
| 2013/0067564 A1* | 3/2013 | Fok Ah Chuen | G06F 21/6218 |
| | | | 726/17 |
| 2013/0167228 A1 | 6/2013 | Wong | |
| 2016/0204940 A1* | 7/2016 | Zachey | H04L 9/3226 |
| | | | 713/193 |

OTHER PUBLICATIONS

AIX Version 4.3 System Management Guide: Communications and Networks; <https://www.ualberta.ca/dept/chemeng/AIX-43/share/man/info/C/a_doc_lib/aixbman/commadmn/nfs_secure.htm>.

* cited by examiner ns and, data for a mass storage device, according to embodiments.
DATA MANAGEMENT FOR A MASS STORAGE DEVICE

BACKGROUND

This disclosure relates generally to computer systems and, more particularly, relates to data management for a mass storage device. Data management may be desired to be performed as efficiently as possible. The amount of data that needs to be managed by enterprises is increasing. As data needing to be managed increases, the need for data management efficiency may increase.

SUMMARY

Aspects of the disclosure relate to securing selected information on a mass storage device using tokens in various embodiments. The mass storage device may be connected to a first computing device, and an initialization application may be run to generate a first token. The first token may be associated with the mass storage device. One or more files of the mass storage device may be selected for sharing, and one or more selected permissions may be specified for the selected files. A second token may be generated and associated with the selected files. In response to the mass storage device being connected to a second computing device, input of a token may be prompted. After receiving input of the token, the token may be analyzed to determine whether or not it matches the second token. When the token matches the second token, access to the selected file may be permitted. When the token does not match the second token, access to the selected file may be denied.

Disclosed aspects relate to data management for a mass storage device. The mass storage device may be structured to include an encrypted file system to store a set of data and a token analyzer to manage access to the encrypted file system. A connection between the mass storage device and a computing device may be sensed. In response to sensing the connection, a token corresponding with the computing device may be detected. Based on the token, the token analyzer may determine to provide the computing device a set of selected permissions to the encrypted file system. The set of selected permissions to the encrypted file system may be provided by the mass storage device to the computing device.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
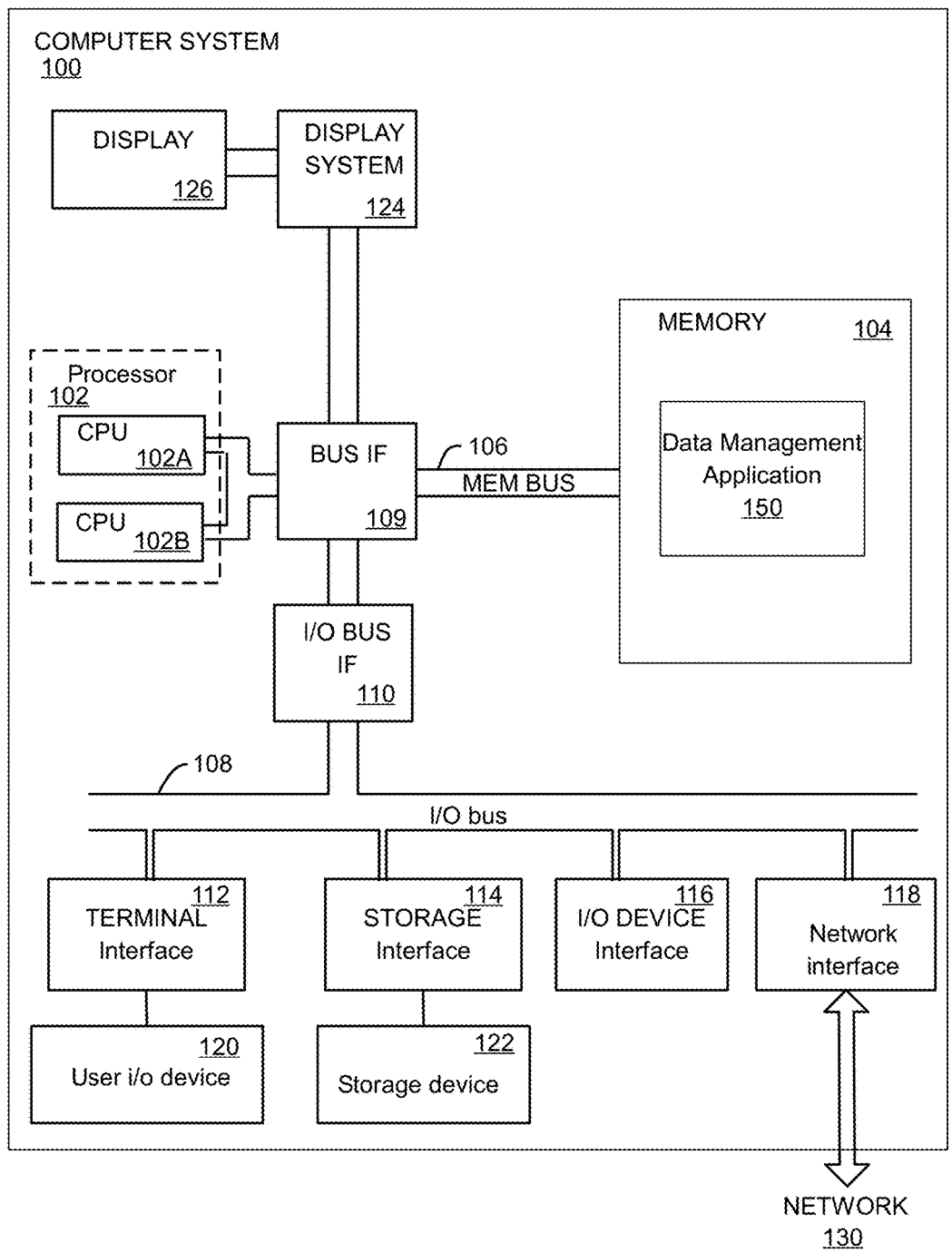
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to securing selected information on a mass storage device using token in various embodiments. The mass storage device may be connected to a first computing device, and an initialization application may be run to generate a first token. The first token may be associated with the mass storage device. One or more files of the mass storage device may be selected for sharing, and one or more selected permissions may be specified for the selected files. A second token may be generated and associated with the selected files. In response to the mass storage device being connected to a second computing device, input of a token may be prompted. After receiving input of the token, the token may be analyzed to determine whether or not it matches the second token. When the token matches the second token, access to the selected file may be permitted. When the token does not match the second token, access to the selected file may be denied, thereby providing security.

As the amount of information available over computer networks increases, mass storage devices are one valuable tool available to users for managing data and information. In some situations, mass storage devices (e.g., USB removable storage devices) may be shared between users as one means of transferring data. Aspects of the disclosure relate to the recognition that, in certain embodiments, it may be desirable to protect the contents of a mass storage device while still allowing authorized users to access particular portions of data. Accordingly, aspects of the disclosure relate to generating a token corresponding to a first subset of data on the mass storage device, and associating the token with one or more selected permissions with respect to the first subset of the set of data. As such, subsequent submission of the token via a computing device may provide authentication to allow for provision of the selected permissions to the computing device. As an example, provision of the selected permissions may allow for read-access or write access to the first subset of the set of data.

Aspects of the disclosure include a security enabled mass storage device and a method, system, and computer program product for data management for a mass storage device. The mass storage device may include a USB mass storage device class. A first file may include the first subset of the set of data, a second file can include the second subset of the set of data, and the first file may differ from the second file. The mass storage device may be structured to include an encrypted file system to store a set of data and a token analyzer to manage access to the encrypted file system. Structuring the mass storage device may include connecting the mass storage device with an original computer, wherein an application for initialization runs automatically and configures a master token for the mass storage device. The mass storage device may include a portable device or a non-removable device. In response to connecting the mass storage device with the original computer, the master token corresponding with the original computer may be detected. The original computer may have a first user. In response to detecting the master token, the master token may be associated with the mass storage device. In embodiments, structuring the mass storage device may include generating, by the application, a first token for the first subset of the set of data to indicate a chosen permission. The chosen permission may be selected by the first user for a first subset of the set of data.

Aspects of the disclosure relate to sensing a connection between the mass storage device and a computing device. In response to sensing the connection, a token corresponding with the computing device may be detected. In embodiments, the token may include an access token. In embodiments, the token may include a security token. Detecting the token may include the application running automatically and prompting a second user for the token. A second token may be received from the second user, wherein the token includes the second token. In embodiments, the token analyzer may compare the token with a set of generated tokens on the mass storage device.

Aspects of the disclosure relate to determining, by the token analyzer based on the token, to provide the computing device a set of selected permissions to the encrypted file system. In embodiments, determining may include determining, by the token analyzer, that the second token matches the first token, and determining to provide the computing device with a chosen permission for the first subset of the set of data. In embodiments, determining may include determining, by the token analyzer, that the second token mismatches the first token, and determining to deny the computing device the chosen permission for the first subset of the set of data.

In embodiments, the set of selected permissions may allow access to a first subset of the set of data, and prevent access to a second subset of the set of data based on the token. In embodiments, the set of selected permissions may allow read-access to the first subset of the set of data and prevent write-access to the first subset of the set of data based on the token. In embodiments, the set of selected permissions may include hiding the second subset of the set of data based on the token. In embodiments, the set of selected permissions may allow write-access to the encrypted file system based on the token. In embodiments, the set of selected permissions may prevent write-access to the set of data based on the token. In embodiments, the set of selected permissions may allow master access to the mass storage device. In embodiments, the set of selected permissions may permit or deny presentation of a set of metadata related to a set of attributes of the mass storage device based on the token. In embodiments, the set of selected permissions may permit copying a first subset of the set of data from the mass storage device to the computing device based on the token, or deny copying a second subset of the set of data from the mass storage device to the computing device based on the token.

Aspects of the disclosure relate to providing, by the mass storage device to the computing device, the set of selected permissions to the encrypted file system. In embodiments, providing may include allowing, with respect to the computing device having the second user, access to the first subset of the set of data according to the chosen permission. In embodiments, providing may include preventing, with respect to the computing device having the second user, access to the first subset of the set of data, and hiding the first subset of the set of data. Aspects of the disclosure may be associated with performance or efficiency benefits (e.g., speed, flexibility, responsiveness, high availability, resource usage, productivity). Aspects may save resources such as bandwidth, processing, or memory.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a data management application 150. In embodiments, the data management application 150 may include instructions or statements that execute on the processor 102 or instructions or statements that are interpreted by instructions or statements that execute on the processor 102 to carry out the functions as further described below. In certain embodiments, the data management application 150 is implemented in hardware via semiconductor devices, chips, logical gates, circuits, circuit cards, and/or other physical hardware devices in lieu of, or in addition to, a processor-based system. In embodiments, the data management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
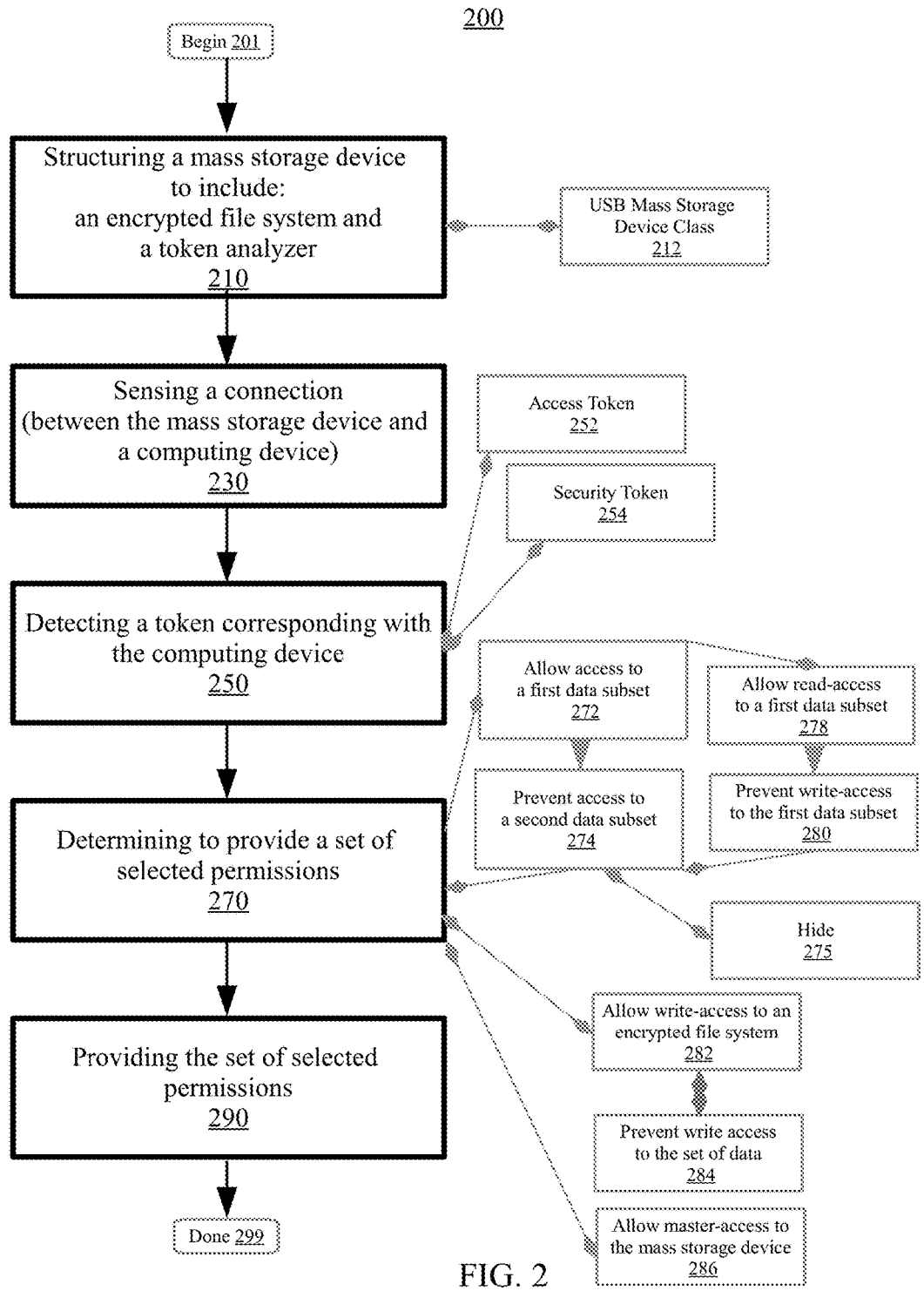
FIG. 2 is a flowchart illustrating a method for managing data for a mass storage device, according to embodiments.

FIG. 2 is a flowchart illustrating a method 200 for managing data for a mass storage device. Aspects of method 200 relate to determining to provide a set of selected permissions for a mass storage device based on a token corresponding with a computing device (e.g., authorizing a user with the selected set of permissions to an encrypted file system). The selected permissions may allow or prevent access to an encrypted file system of the mass storage device. The token may facilitate data security for the mass storage device. The method 200 may begin at block 201.

At block 210, a mass storage device may be structured. The mass storage device may be structured to include an encrypted file system to store a set of data and a token analyzer (e.g., an integrated token analyzer which is integrated into/with the encrypted file system) to manage access to the encrypted file system. Generally, structuring can include building, constructing, creating, configuring, or otherwise establishing the mass storage device to include the encrypted file system and the token analyzer. In embodiments, structuring may include configuring the mass storage device to maintain and facilitate operation of the encrypted file system and the token analyzer. For instance, structuring may include performing a formatting operation on the mass storage device, and loading the encrypted file system and the token analyzer into the memory of the mass storage device. Other methods of structuring the mass storage device are also possible.

The mass storage device may be structured to include an encrypted file system and a token analyzer. In embodiments, a single computing module, application, or other software component may be configured to include both the encrypted file system and the token analyzer. In certain embodiments, the encrypted file system and the token analyzer may each correspond to a separate software component that are communicatively connected or otherwise associated with each other. The encrypted file system can include a database, file directory, storage partition, or other method of data organization that offers one or more means of data encryption. As examples, the encrypted file system may make use of file-system level encryption, public key ciphers (e.g., RSA, ElGamal), symmetric-key algorithms (e.g., Advanced Encryption Standard), or other data encryption means. For instance, in certain embodiments, the encrypted file system may include an index of files and folders encrypted using a cryptographic file system. The token analyzer can include a widget, processing module, or other software component for managing access to the encrypted file system. In embodiments, the token analyzer may be configured to allow or prevent access to the encrypted file system based on a token. For instance, the token analyzer may evaluate a token corresponding with a computing device, and determine a set of selected permissions based on the token. Other types of encrypted file systems and token analyzers are also possible.

In embodiments, the mass storage device may include being of a USB mass storage device class at block 212. The mass storage device class can include a set of computing protocols that facilitate data communication between the mass storage device and a host computing device using a universal serial bus (USB). In embodiments, the mass storage device may include a removable USB storage device. For instance, in embodiments, the mass storage device may include an external storage drive (e.g., solid-state drive, magnetic hard drive), external optical drive (e.g., CD, DVD, Blu-Ray drive), portable flash memory devices, memory cards, digital cameras (e.g., to use aspects described herein to secure/transfer still images), digital media players, mobile phones (e.g., smart phones, cellular phones), tablets, or the like. In certain embodiments, the mass storage device may include a non-removable storage device. As examples, the mass storage device may include internal storage drives (e.g., solid-state drive, magnetic hard drive), networked storage devices (e.g., network-attached storage) or the like. Other types of mass storage device are also possible.

At block 230, a connection between the mass storage device and a computing device may be sensed. Generally, sensing can include recognizing, discovering, ascertaining, determining, or otherwise detecting the connection between the mass storage device and the computing device. In embodiments, sensing can include identifying a link, coupling, or other association that facilitates communication and the transfer of information between the mass storage device and the computing device. In embodiments, the connection can include a physical interface between the mass storage device and the computing device. For example, sensing the connection can include recognizing that the mass storage device has been physically attached to a communication port of the computing device (e.g., via a USB port). In certain embodiments, the connection may include a network connection between the mass storage device and the computing device. As an example, sensing the connection can include recognizing that the mass storage device is configured for communication with the computing device using one or more network or wireless communication standards (e.g., wireless USB, local-area network, Bluetooth). Other methods of sensing the connection between the mass storage device and the computing device are also possible.

At block 250, a token corresponding with the computing device may be detected. The token corresponding with the computing device may be detected in response to sensing the connection between the mass storage device and the computing device. Generally, detecting can include recognizing, discovering, ascertaining, sensing, determining, or otherwise identifying the token corresponding with the computing device. The detecting can be carried-out by the mass storage device. In embodiments, detecting may include receiving input of the token via the computing device. The token can correspond to a user of the computing device (e.g., master user, first user, second user). For instance, in certain embodiments, detecting the token may include receiving security credentials provided by a user via a graphical user interface of the computing device. In certain embodiments, detecting the token may include identifying a connection between the computing device and a hardware device. For example, the hardware device may include a physical device configured to connect with the computing device and provide authorization. Other methods of detecting the token are also possible.

In embodiments, the token may include an access token at block 252. Generally, the access token can include a string of characters, alphanumeric identifier, password, security key, verification credentials, or other virtual item or data object configured to authenticate the identity or access approval of a requesting party (e.g., computing device). In embodiments, the token may be associated with one or more portions of secure data (e.g., files, folders) or computer operations (e.g., data management operations) such that authentication of the access token allows an authenticated party full or partial access to the data or computer operations. As described herein, in certain embodiments, the access token may be detected in response to sensing the connection between the mass storage device and the computing device. For instance, in response to sensing that a USB mass storage device has been connected to the computing device, the access token may be provided to the computing device using a graphical user interface. Consider the following example. In response to sensing a connection between a USB storage device and the computing device, a graphical user interface may be displayed that prompts a user for an access token. The user may enter an access token of "SDJ6740" into the graphical user interface. Accordingly, in certain embodiments, full or partial access to data or data management operations with respect to the mass storage device may be granted to the computing device. Other methods of detecting the access token are also possible.

In embodiments, the token may include a security token at block 254. Generally, the security token can include a physical device configured to authenticate the identity or access approval of a requesting party (e.g., computing device). As examples, the security token may include a USB device, Bluetooth device, key fob, RFID device, password token, NFC device, mobile device (e.g., smart phone) or the like. As described herein, the token may be associated with one or more portions of secure data (e.g., files, folders) or computer operations (e.g., data management operations) such that authentication of the security token allows an authenticated party full or partial access to the data or computer operations. In embodiments, the security token may include information including cryptographic keys, digital signatures, biometric data (e.g., fingerprint information), or other information for use in verifying the security token. In certain embodiments, the security token may include one or more of a static password token (e.g., invisible password transmitted to the computer device upon connection), synchronous dynamic password token (e.g., cryptographic algorithm generated time-sensitive token), asynchronous password token (e.g., one-time non-time-sensitive token), time-synchronized one-time passwords, mathematical-algorithm-based one-time passwords, or the like. Consider the following example. In response to sensing a connection between a USB storage device and the computing device, the computing device may scan for nearby Bluetooth-enabled security tokens and discover a mobile device (e.g., smart phone, tablet). In response to establishing a connection between the computing device and the mobile device, the mobile device may provide a cryptographic key for authentication by the mass storage device. Accordingly, in response to verification of the cryptographic key, full or partial access to data or data management operations with respect to the mass storage device may be granted to the computing device. Other methods of detecting the security token are also possible.

At block 270, a set of selected permissions to the encrypted file system may be determined by the token analyzer based on the token. The set of selected permissions may be provided to the computing device. Generally, determining can include identifying, selecting, computing, resolving, or ascertaining the set of selected permissions. In embodiments, determining the set of selected permissions may include ascertaining a degree of access for a particular computing device with respect to the mass storage device. For instance, determining the set of selected permissions may include selecting one or more portions of data (e.g., files, folders) or actions (e.g., data management operations) that may be fully or partially accessed by a particular computing device. In embodiments, determining the set of selected permissions may include or result-in preventing or denying access to a portion of data or computer operation with respect to the mass storage device. As an example, determining the set of selected permissions can include selecting one or more data files maintained in the encrypted file system of the mass storage device for read-access by the computing device. As another example, determining the set of selected permissions may include denying a particular computing device the ability to copy data to or from the encrypted file system of the mass storage device. Other methods of determining the set of selected permissions are also possible.

In embodiments, the set of selected permissions may be determined by the token analyzer. As described herein, the token analyzer may include a widget, processing module, or other software component for managing access (e.g., allowing or preventing) to the encrypted file system based on a token. In embodiments, the token analyzer may include a software widget configured to run natively on the mass storage device. Accordingly, in certain embodiments, in response to detecting the token corresponding with the computing device, the token analyzer may be configured to analyze the detected token and determine the set of selected permissions. The token analyzer may be configured to examine (e.g., performing an inspection of the token), evaluate (e.g., generating an appraisal of the token), resolving (e.g., ascertaining an observation/conclusion/answer with respect to the token), parsing (e.g., deciphering structured and unstructured data constructs of the token), querying (e.g., asking a question regarding the token), or categorizing (e.g., organizing by a feature or type of the token). In certain embodiments, the token analyzer may be configured to operate on the computing device, or borrow hardware resources from computing device for use in analyzing the token. As described herein, the set of selected permissions may be determined based on the token. In embodiments, the token may specify the set of selected permissions to be granted for a particular computing device. Other methods of determining the set of selected permissions are also possible.

In embodiments, the set of selected permissions may include allowing access to a first subset of the set of data at block 272. Allowing access to the first subset of the set of data may be based on the token. Generally, allowing access can include permitting, granting, authorizing, or approving of viewing or usage of the first subset of the set of data. In embodiments, the first subset of the set of data may include a portion of the data maintained on the mass storage device. For example, the first subset of the set of data may include a file, group of files, folder, or other information of the mass storage device. In embodiments, a first file (of a set of files) may include the first subset of the set of data, and a second file (of the set of files) may include a second subset of the set of data. The first file may differ from the second file. In embodiments, allowing access may include granting read access (e.g., ability to view or observe) or write access (e.g., ability to modify or edit) to the first subset of the set of data. As an example, a party with read and write access to a subset of the set of data may rename one or more files, add content, and delete content included in the first subset of the set of data. Other methods of allowing access are also possible.

In embodiments, the set of selected permissions may include preventing access to a second subset of the set of data at block 274. Preventing access to the second subset of the set of data may be based on the token. Generally, preventing access can include denying, disabling, restricting, limiting, or forbidding viewing or usage permissions with respect to the second subset of the set of data. The second subset of the set of data may include a file, group of files, folder, or other information of the mass storage device. In embodiments, the second subset of the set of data may substantially correspond to the first subset of the set of data. In embodiments, the second subset of the set of data may be different than the first subset of the set of data. In embodiments, preventing access may include denying read access (e.g., ability to view or observe) or write access (e.g., ability to modify or edit) to the second subset of the set of data. As an example, a party that is denied read and write access to a subset of the set of data may not be able to view the contents of the second subset, or perform any data management operations (e.g., copying, editing) with respect to the second subset of the set of data. Other methods of preventing access are also possible.

In embodiments, aspects of the disclosure relate to allowing access to a first data subset and preventing access to a second data subset of the set of data maintained in the encrypted file system of the mass storage device. Consider the following example. A mass storage device having a first file and a second file in an encrypted file system may be connected to a computing device. An access token of "HTK34489" may be detected. The token analyzer of the mass storage device may analyze the access token and determine a set of selected permissions for the computing device based on the token. In embodiments, the set of selected permissions may include allowing read and write access to the first file (e.g., first data subset) and preventing read and write access to the second file (e.g., second data subset) of the mass storage device. Accordingly, the computing device may be authorized to view the first file, copy the file contents, and perform other data management operations, but may be denied access entirely to the second file. Other methods of allowing and preventing access to the set of data are also possible.

In embodiments, the set of selected permissions may include hiding the second subset of the set of data at block 275. Hiding the second subset of the set of data may be based on the token. Generally, hiding can include concealing or otherwise removing the second subset of the set of data from view. In embodiments, hiding the second subset of the set of data can include configuring the encrypted file system such that the second subset of the set of data is no longer visible to viewers of the contents of the mass storage device. In certain embodiments, hiding the second subset of the set of data may include masking the amount of storage space occupied by the second subset of the set of data such that the second subset of the set of data does not appear to be located on the mass storage device. As an example, in certain embodiments, the second subset of the set of data may include manufacturing plans for a highly-confidential new product in development by a technology company. To prevent unauthorized access to the manufacturing plans (e.g., in the event that the mass storage device is lost or stolen), the manufacturing plans may be hidden such that they will not appear to unauthorized viewers of the mass storage device. Other methods of hiding the second subset of the set of data are also possible.

In embodiments, the set of selected permissions may include allowing read-access to a first data subset at block 278. Allowing read-access to the first data subset may be based on the token. As described herein, allowing read-access to the first data subset can include granting permission to view or browse the contents of a first portion of the data stored in the encrypted file system of the mass storage device. In embodiments, write-access may be prevented to the first subset of the set of data at block 280. Preventing write-access may include denying, forbidding, or limiting the authorization or ability to edit or modify the contents of a first portion of the data stored in the encrypted file system of the mass storage device. As described herein, aspects of the disclosure relate to allowing read-access and preventing write-access to the same data subset of the set of data. Consider the following example. The first data subset of the set of data may include a set of report cards for a group of students. In embodiments, read-access to the set of report cards may be allowed for one or more computing devices (e.g., of the students, their parents, or other select individuals) and write-access to the set of report cards may be prevented for the computing devices. Accordingly, the report cards may be viewed by the authorized computing devices (e.g., such that students may know their scores) while editing of the report cards may be denied (e.g., to prevent potential tampering with the grades). Other methods of managing the set of selected permissions are also possible.

In embodiments, the set of selected permissions may include allowing write-access to the encrypted file system at block 282. Allowing write-access to the encrypted file system may be based on the token. In embodiments, allowing write-access may include permitting modifying, editing, or configuring of the encrypted file system of the mass storage device. In embodiments, write-access to the encrypted file system may permit copying, renaming, creating, editing, or deleting of the files stored in the encrypted file system. In certain embodiments, write-access to the encrypted file system may permit configuring the encryption parameters of the encrypted file system such that the types and levels of encryption used for different files may be specified. As an example, a computing system associated with write-access to the encrypted file system may be permitted to add new content to one or more files stored in the encrypted file system, and specify a new encryption configuration for the edited files to facilitate a greater degree of data security. Other methods of managing write-access to the encrypted file system are also possible.

In embodiments, the set of selected permissions may include preventing write-access to the set of data at block 284. Preventing write-access to the mass storage device may be based on the token. In embodiments, preventing write-access to the mass storage device may include limiting or prohibiting actions including modifying, editing, deleting, or saving new data to the mass storage device. For instance, a computing device that is prevented from write-access to the mass storage device may not be allowed to add or delete content from the encrypted file system, or copy data to or from the mass storage device. Consider the following example. A mass storage device may include one or more files related to a financial earnings presentation. A computing device that is prevented from-write access to the mass storage device may not be allowed to add or remove slides, modify the title, save new images, copy, or make other changes to the content of the financial earnings presentation files. Other methods of preventing write-access to the set of data are also possible.

In embodiments, the set of selected permissions may include allowing master-access to the mass storage device at block 286. Allowing master-access to the first data subset may be based on the token. In embodiments, allowing master-access to the mass storage device may include providing full administrator access to the mass storage device, including both the encrypted file system and the token analyzer. Master-access to the mass storage device may permit configuration (e.g., reconfiguration) or modification of the settings of the token analyzer as well as full access (e.g., read/write) privileges to the data on the encrypted file system. For instance, computing devices associated with master access to the mass storage device may be permitted to specify the selected permissions (e.g., designate the access privileges associated with particular tokens) and modify the parameters of the token analyzer (e.g., adjust the criteria by which the token analyzer evaluates the token). Consider the following example. A computing device with master-access to the mass storage device may generate a token of "62395737," and assign the token to a first file of the mass storage device. It may further be specified that the token allows actions of "Read-only: 6 hours." As such, provision of the token "62395737" may allow for read-access of the first file for a 6 hour period. Other methods of managing master-access to the mass storage device are also possible.

At block 290, the set of selected permissions to the encrypted file system may be provided. The set of selected permissions may be provided by the mass storage device to the computing device. Generally, providing can include transmitting, instantiating, or assigning (to implement, initiate, execute, or establish) the set of selected permissions. In embodiments, providing may include configuring the security parameters related to access for the computing device in order to implement the set of selected permissions. For instance, providing the security permissions may include editing the file and folder access permission parameters for the computing device with respect to the encrypted file system to specify portions of the encrypted file system as "read-access only," "write-access only," "master access," or combinations thereof. In embodiments, providing the set of selected permissions may include configuring the security parameters for the computing device based on a token evaluated by a separate computing device. Consider the following example. In response to validating a first token corresponding with a first computing device, the first computing device may be used to remotely configure (e.g., using a communication network) the security parameters of a second computing device to have read-access and write-access to the mass storage device. Other methods of providing the set of selected permissions are also possible.

Consider the following example. A USB mass storage device may be formatted to include an encrypted file system and a token analyzer. The encrypted file system may include 12 financial reports, each financial report corresponding to the financial results of a company over a 12-month period of time. The USB mass storage device may be connected to a first computing device. In response to sensing the connection between the USB mass storage device and the first computing device, a software token of "AGLBNV" may be detected (e.g., input by a user of the first computing device). The token analyzer of the USB mass storage device may evaluate the software token, and ascertain that the software token of "AGLBNV" is associated with read-access to all 12 financial reports, while both read-access and write-access may be allowed for the financial reports corresponding to the months of November and December. Accordingly, the security parameters of the first computing device may be configured to provide read-access to all 12 financial reports and both read-access and write-access to the financial reports for November and December. Other methods of managing data for the mass storage device are also possible.

Method 200 concludes at block 299. Aspects of method 200 may provide performance or efficiency benefits for data management for a mass storage device. For example, aspects of method 200 may have positive impacts with respect to information security. In embodiments, the structuring, the sensing, the detecting, the determining, and the providing described herein may each occur in an automated fashion without user intervention. Altogether, determining a set of selected permissions to the encrypted file system of a storage device based on a token corresponding with a computing device may be associated with performance or efficiency benefits (e.g., speed, flexibility, responsiveness, high availability, resource usage, productivity).

Figure 3:
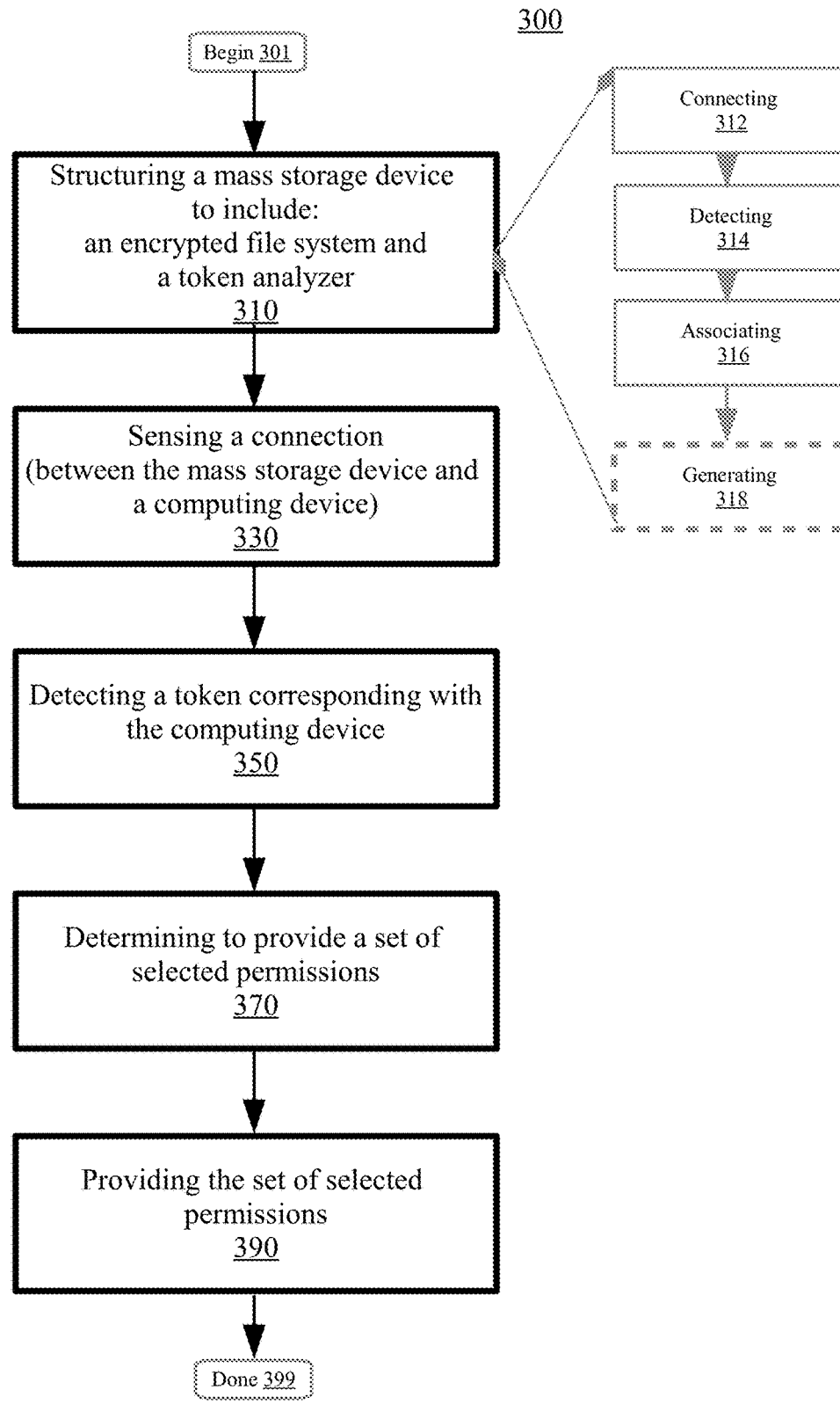
FIG. 3 is a flowchart illustrating a method for managing data for a mass storage device, according to embodiments.

FIG. 3 is a flowchart illustrating a method 300 for managing data for a mass storage device. Aspects of method 300 relate to structuring the mass storage device. At block 310, a mass storage device may be structured to include an encrypted file system and a token analyzer. At block 330, a connection between the mass storage device and a computing device may be sensed. At block 350, a token corresponding with the computing device may be detected. At block 370, a set of selected permissions may be determined. At block 390, the set of selected permissions may be provided. Aspects of the method 300 may substantially correspond to other embodiments described herein, including FIGS. 1-6. The method 300 may begin at block 301.

As described herein, aspects of the disclosure relate to structuring the mass storage device. Structuring can include building, constructing, creating, configuring, or otherwise establishing the mass storage device to include the encrypted file system and the token analyzer. In embodiments, structuring the mass storage device may include connecting the mass storage device with an original computer at block 312. The mass storage device may include a portable device (e.g., USB removable storage, mobile computing device) or a non-removable device (e.g., internal hard drive). In embodiments, an application for initialization may run automatically and configure a master token for the mass storage device. The application for initialization may include a software program, widget, or other application for performing initial setup, repair, or configuring of the mass storage device. In embodiments, the application may include an executable file stored on the mass storage device that executes automatically upon connection with the original computer to establish the encrypted file system and the token analyzer on the mass storage device. In embodiments, the application may be configured to create a master token for the mass storage device. The master token may include a token (e.g., string of characters, alphanumeric identifier, password, security key, or the like) associated with master access to the mass storage device. As described herein, master access may include full administrator access to the mass storage device, including both the encrypted file system and the token analyzer. Master-access to the mass storage device may permit configuration (e.g., reconfiguration) or modification of the settings of the token analyzer as well as full access (e.g., read/write) privileges to the data on the encrypted file system. Other methods of initializing the mass storage device are also possible.

In embodiments, the master token corresponding with the original computer having a first user may be detected at block 314. Detecting the master token corresponding with the original computer having a first user may be performed in response to connecting the mass storage device with the original computer. Generally, detecting can include ascertaining, recognizing, or identifying the master token corresponding with the original computer having a first user. In embodiments, detecting may include receiving authentication in the form of log-on credentials, a user account selection, or other identification from the first user. The first user may include an administrator, primary user, device owner (e.g., of the mass storage device), or other party (e.g., individual, organization) associated with the mass storage device. In embodiments, the first user may be a user of the original computer who initiated configuration of the mass storage device. As an example, the first user may select a user account (e.g., associated with the master token) and log-in to the original computer. The first user may then connect the mass storage device to the original computer and initiate set up (e.g., structuring) of the mass storage device. Other methods of detecting the master token corresponding with the original computer having a first user are also possible.

In embodiments, the master token may be associated with the mass storage device at block 316. The master token may be associated with the mass storage device in response to detecting the master token. Generally, associating can include relating, joining, grouping, linking, or otherwise correlating the mass storage device with the master token. In embodiments, associating may include configuring the parameters of the token analyzer of the mass storage device to register the master token with the mass storage device. As such, the master token may be paired or coupled with the mass storage device such that provision of the master token (e.g., by a user; first user) enables master access to the mass storage device. As an example, in certain embodiments, associating the master token with the mass storage device may include receiving entry of the master token and recording it in a database or directory of tokens, and selecting a status of "master token" for the master token. As such, the master token may be recognized upon subsequent submissions to the token analyzer. Other methods of associating the master token with the mass storage device are also possible.

In embodiments, structuring the mass storage device may include generating a first token at block 318. The first token may be generated by the application based on a chosen permission selected for a first subset of the set of data by the user. Generally, generating can include creating, producing, providing, assigning, or establishing the first token. In embodiments, generating the first token can include assigning a token (e.g., string of characters, alphanumeric identifier, password, security key, or the like) to a chosen permission (e.g., read or write access to a portion of data) specified by a user (e.g., the first user). For instance, in response to receiving a user's designation of a chosen permission for a first subset of the set of data, the application may create a first token for the first subset of the set of data to indicate the chosen permission. In embodiments, the first token may be generated by the application using a cryptographic hash function or other algorithm. In certain embodiments, the first token may be specified by the first user. As an example, a first token of "opensesame" may be created by a user and assigned to a chosen permission of "read-access" for a first folder maintained in the encrypted file system of the mass storage device. Other methods of generating the first token are also possible.

Consider the following example. A first user may use a graphical user interface to input a command to generate a token to the application. The first user can initiate storing three files on the mass storage device. Using aspects described herein, the first user may be prompted to select the data or information of the mass storage device for which he or she wishes to create the token. The first user may select two of the three files which are (to be) stored in the encrypted file system. In response to receiving the user's selection, the application may prompt the user to specify the chosen permissions for the two files. In embodiments, the user may designate a chosen permission of "read-access only" for the two files. Accordingly, in response to receiving the user's input, the application may generate a first token of "HJ488LI" for the two files associated with the chosen permission of "read-only access." As described herein, subsequent provision of the first token of "HJ488LI" (e.g., by a second user) may grant read-only access to the two files. Other methods of generating the first token are also possible.

Method 300 concludes at block 399. Aspects of method 300 may provide performance or efficiency benefits for data management for a mass storage device. For example, aspects of method 300 may have positive impacts with respect to information security. In embodiments, the structuring, the sensing, the detecting, the determining, and the providing (and other operational steps in embodiments) described herein may each occur in an automated fashion without user intervention. Altogether, determining a set of selected permissions to the encrypted file system of a storage device based on a token corresponding with a computing device may be associated with performance or efficiency benefits (e.g., speed, flexibility, responsiveness, high availability, resource usage, productivity).

Figure 4:
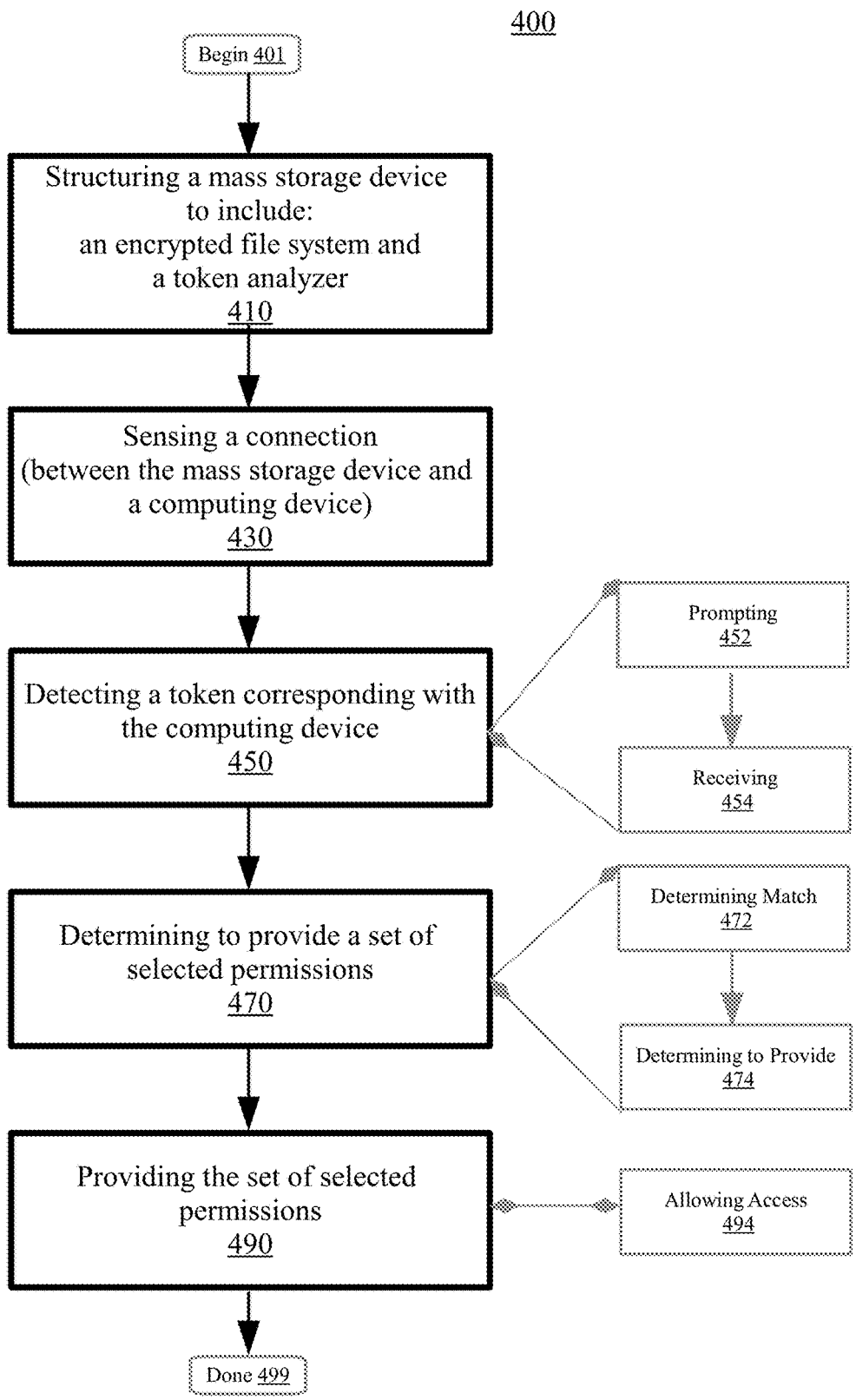
FIG. 4 is a flowchart illustrating a method for managing data for a mass storage device, according to embodiments.

FIG. 4 is a flowchart illustrating a method 400 for managing data for a mass storage device. Aspects of method 400 relate to managing access to the mass storage device based on a token received from a second user. In embodiments, the second user may be different than the first user. In embodiments, the second user may be the same as the first user. At block 410, a mass storage device may be structured to include an encrypted file system and a token analyzer. At block 430, a connection between the mass storage device and a computing device may be sensed. At block 450, a token corresponding with the computing device may be detected. At block 470, a set of selected permissions may be determined. At block 490, the set of selected permissions may be provided. Aspects of the method 400 may substantially correspond to other embodiments described herein, including FIGS. 1-6. The method 400 may begin at block 401.

In embodiments, a second user may be prompted for a token at block 452. The embodiments, the application may run automatically in response to sensing the connection between the mass storage device and the computing device. Generally, prompting can include requesting or proposing suggested input of the token. In embodiments, prompting can include displaying a graphical user interface element requesting input of the token from the second user. As an example, in response to the second user connecting the mass storage device to the computing device, the application may run automatically and display a dialogue box that prompts the second user to input the token. In embodiments, a second token may be received from the second user at block 454. The token may include the second token. Generally, receiving the second token can include collecting, gathering, obtaining, detecting, or otherwise accepting delivery of the second token. As described herein, the second token may include a string of characters, alphanumeric identifier, password, security key, or verification credentials. As an example, a second user may input the second token using a keyboard, touch screen input, microphone, camera, or other input method. Other methods of prompting for and receiving the second token are also possible.

In embodiments, it may be determined that the second token matches the first token at block 472. Determining that the second token matches the first token may be determined by the token analyzer. Generally, determining can include identifying, mapping, matching, or otherwise ascertaining that the second token matches the first token. In certain embodiments, determining that the second token matches the first token may include comparing the second token with a database or directory of registered tokens, and identifying that the second token corresponds with a first token recorded in the token database. Consider the following example. A second token of "CLKE573" may be received from the second user. The token analyzer may search a database of registered tokens, and identify that a first token of "CLKE573" is registered in the token database. Accordingly, the second token may be determined to match the first token. Other methods of determining that the second token matches the first token are also possible.

In embodiments, based on the second token matching the first token, the chosen permission for the first subset of the set of data may be determined to be provided at block 474. The chosen permission for the first subset of the set of data may be determined to be provided to the computing device having the second user. Generally, determining can include ascertaining, identifying, or resolving to provide the chosen permission. In embodiments, determining can include inspecting the token database to identify the chosen permissions associated with a particular token. For instance, the token database may include data entries associated with each token that describe the chosen permissions allowed by that token (e.g., as specified by a first user). In certain embodiments, determining to provide the chosen permission may include evaluating the chosen permission associated with the first token, and validating that the chosen permission does not conflict with any other specified permissions (e.g., the chosen permission allows access to a first file, but the first file is located in a folder locked by a separate chosen permission). In response to verifying that no such conflicts exist, the chosen permission for the first subset of the set of data may be determined to be provided to the second user. In certain embodiments, determining to provide the chosen permission may include examining the contents of the encrypted file system to verify that the first subset of the set of data remains in the same file location as when the chosen permission was specified. In response to verifying that the first subset of the set of data is in the original file location (e.g., or in another file location to which the second user is allowed access) the chosen permission for the first subset of the set of data may be determined to be provided to the second user. Other methods of determining to provide the chosen permission are also possible.

In embodiments, access to the first subset of the set of data may be allowed according to the chosen permission at block 494. Access to the first subset of the set of data may be allowed with respect to the computing device having the second user. Generally, allowing can include permitting, admitting, or otherwise granting access to the first subset of the set of data. In embodiments, allowing access to the first subset of the set of data may include permitting the computing device having the second user to navigate to the file location of the first subset of the set of data. In certain embodiments, allowing access may include providing instructions or guidance to assist a second user in accessing the first subset of the set of data. As an example, a dialogue box may be displayed that includes a link to the file location of the first subset of the set of data. In embodiments, allowing access to the first subset of the set of data may include updating other choice permissions with respect to the computing device having the second user. For instance, the choice permissions associated with the computing device may be evaluated, and choice permissions less restrictive than the allowed permissions may also be permitted. As an example, in response to allowing access to a first folder, choice permissions for one or more individual files within the folder may also be updated to allow the computing device access to individual files. Other methods of allowing access to the first subset of the set of data are also possible.

Consider the following example. A mass storage device including first and second data files may be connected to a computing device. In response to sensing a connection between the mass storage device and the computing device, a dialogue box prompting a user for a token may be displayed, and a token of "DKCUE89483" may be received from the user. The token analyzer of the mass storage device may evaluate the token, and compare it to a database of registered tokens. In embodiments, the token DKCUE89483 may be identified within the token database. In response to verifying a match between the two tokens, the token analyzer may query the token database for chosen permissions associated with the token. For instance, in embodiments, the chosen permissions may allow read-access to the first data file of the mass storage device, and both read-access and write-access to the second data file of the mass storage device. In embodiments, a dialogue box may be displayed with a link to the file location of the first and second data files. Other methods of managing data for the mass storage device are also possible.

Method 400 concludes at block 499. Aspects of method 400 may provide performance or efficiency benefits for data management for a mass storage device. For example, aspects of method 400 may have positive impacts with respect to information security. In embodiments, the structuring, the sensing, the detecting, the determining, and the providing (and other operational steps in embodiments) described herein may each occur in an automated fashion without user intervention. Altogether, determining a set of selected permissions to the encrypted file system of a storage device based on a token corresponding with a computing device may be associated with performance or efficiency benefits (e.g., speed, flexibility, responsiveness, high availability, resource usage, productivity).

Figure 5:
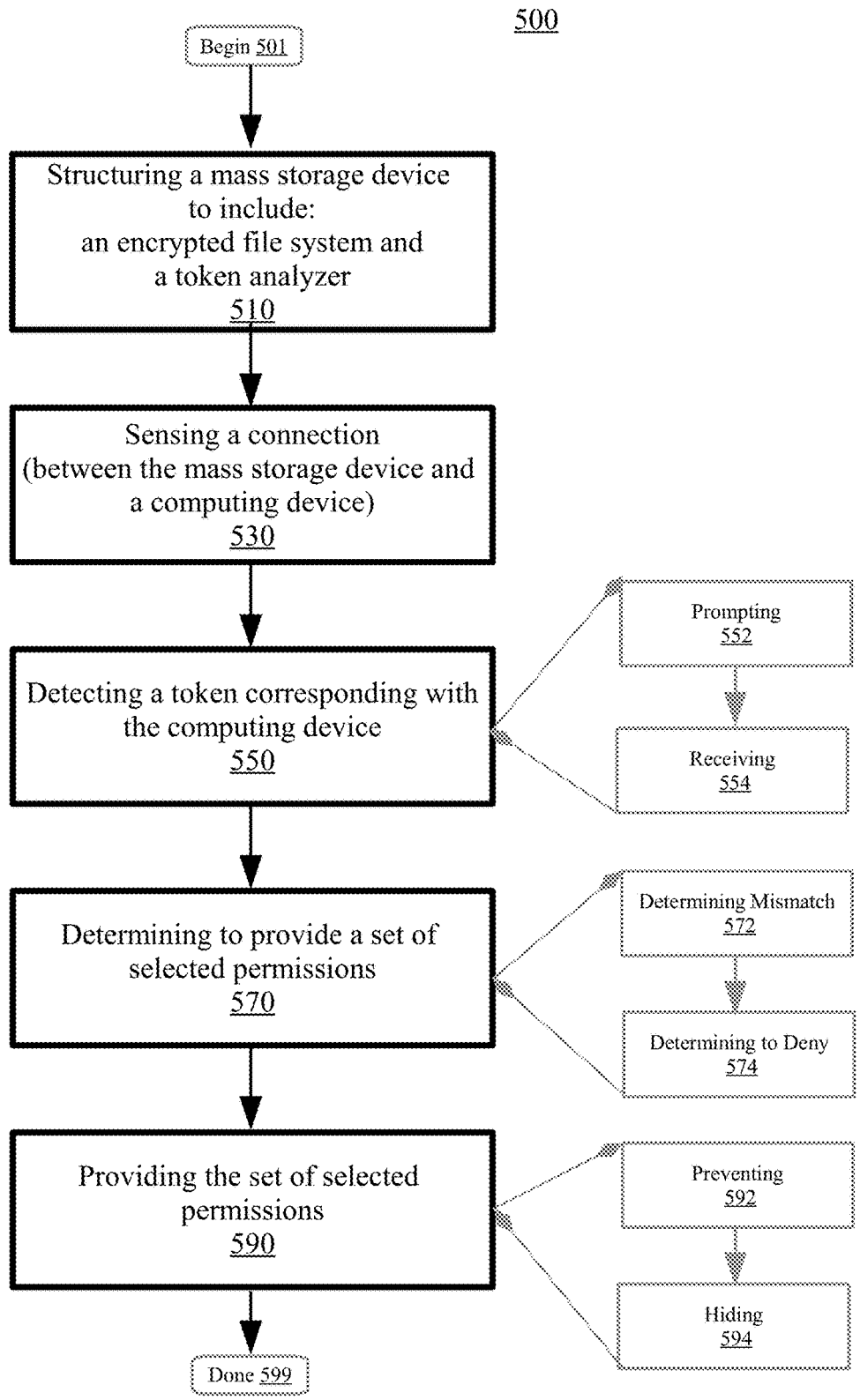
FIG. 5 is a flowchart illustrating a method for managing data for a mass storage device, according to embodiments.

FIG. 5 is a flowchart illustrating a method 500 for managing data for a mass storage device. Aspects of method 500 relate to managing access to the mass storage device based on a token received from a second user. In embodiments, the second user may be different than the first user. In embodiments, the second user may be the same as the first user. At block 510, a mass storage device may be structured to include an encrypted file system and a token analyzer. At block 530, a connection between the mass storage device and a computing device may be sensed. At block 550, a token corresponding with the computing device may be detected. At block 570, a set of selected permissions may be determined. At block 590, the set of selected permissions may be provided. Aspects of the method 500 may substantially correspond to other embodiments described herein, including FIGS. 1-6. The method 500 may begin at block 501.

In embodiments, a second user may be prompted for a token at block 552. The embodiments, the application may run automatically in response to sensing the connection between the mass storage device and the computing device. Generally, prompting can include requesting or proposing suggested input of the token. In embodiments, prompting can include displaying a graphical user interface element requesting input of the token from the second user. As an example, in response to the second user connecting the mass storage device to the computing device, the application may run automatically and display a dialogue box that prompts the second user to input the token. In embodiments, a second token may be received from the second user at block 554. The token may include the second token. Generally, receiving the second token can include collecting, gathering, obtaining, detecting, or otherwise accepting delivery of the second token. As described herein, the second token may include a string of characters, alphanumeric identifier, password, security key, or verification credentials. As an example, a second user may input the second token using a keyboard, touch screen input, microphone, camera, or other input method. Other methods of prompting for and receiving the second token are also possible.

In embodiments, it may be determined that the second token mismatches the first token at block 572. Determining that the second token mismatches the first token may be determined by the token analyzer. Generally, determining can include identifying, mapping, or otherwise ascertaining that the second token does not match the first token. In embodiments, the second token may be examined in contrast with the first token, and it may be determined that one or more aspects of the second token (e.g., format, number or order of characters) differ or conflict with the first token. As such, it may be determined that the second token mismatches the first token. In certain embodiments, determining that the second token mismatches the first token may include comparing the second token with a database or directory of registered tokens, and failing to identify a registered token in the database that corresponds with the second token. Consider the following example. A second token of "O65LBX" may be received from the second user. The token analyzer may search a database of registered tokens, and resolve that no token of "O65LBX" is recorded in the database (e.g., not found by a query). Accordingly, the second token may be determined to mismatch the first token. Other methods of determining that the second token mismatches the first token are also possible.

In embodiments, based on the second token mismatching the first token, the chosen permission for the first subset of the set of data may be determined to be denied at block 574. The chosen permission for the first subset of the set of data may be determined to be denied to the computing device having the second user. Generally, determining can include ascertaining, identifying, or resolving to deny the chosen permission. In embodiments, determining to deny the chosen permission can include evaluating the chosen permission associated with the first token, and validating that denial of the chosen permission does not conflict with any other specified permissions (e.g., denial of the chosen permission may prevent access to a first file, but a separate chosen permission explicitly allows access to the first file). In certain embodiments, identification of such a conflict may include querying the user of the computing device for clarification of the chosen permission. In response to verifying that no such conflicts exist, the chosen permission for the first subset of the set of data may be determined to be denied to the second user.

In embodiments, access to the first subset of the set of data may be prevented at block 592. Access to the first subset of the set of data may be prevented with respect to the computing device having the second user. Generally, preventing can include denying, disabling, restricting, limiting, or forbidding viewing or usage permissions with respect to the first subset of the set of data. As described herein, in embodiments, preventing access may include denying read access (e.g., ability to view or observe) or write access (e.g., ability to modify or edit) to the second subset of the set of data. As an example, a party that is denied read and write access to a subset of the set of data may not be able to view the contents of the second subset, or perform any data management operations (e.g., copying, editing) with respect to the second subset of the set of data. In embodiments, preventing access to the first subset of the set of data may include updating other choice permissions with respect to the computing device having the second user. For instance, the choice permissions associated with the computing device may be evaluated, and choice permissions related to the denied permission may be modified. As an example, in response to denying read-access to a first folder, write-access may also be denied for the folder (e.g., it may be desirable to prevent copying or other modification of the folder). Other methods of preventing access are also possible.

In embodiments, the first subset of the set of data may be hidden at block 594. The first subset of the set of data may be hidden with respect to the computing device having the second user. Generally, hiding can include concealing or otherwise removing the second subset of the set of data from view. In embodiments, hiding the first subset of the set of data can include configuring the encrypted file system such that the first subset of the set of data is no longer visible to viewers of the contents of the mass storage device. In certain embodiments, hiding the first subset of the set of data may include masking the amount of storage space occupied by the first subset of the set of data such that the first subset of the set of data does not appear to be located on the mass storage device. As examples, hiding the first subset of the set of data may include concealing information regarding the creation date, author, file type, and other properties of the first subset of the set of data. Other methods of hiding the second subset of the set of data are also possible.

Consider the following example. A mass storage device including four data files may be connected to a computing device. In response to sensing a connection between the mass storage device and the computing device, a dialogue box prompting a user for a token may be displayed, and the user may connect a security token in the form of a USB device (different from the mass storage device) to the computing device. The token analyzer of the mass storage device may evaluate the USB device, and compare it to a directory of authorized security tokens. In embodiments, record of the security token may not be located within the directory of authorized security tokens. In response to failing to find authorization permission for the security token, the token analyzer may determine to prevent access to the mass storage device. For instance, in embodiments, the encrypted file system of the mass storage device may be set to a lock configuration that prevents read-access and write-access to the four data files, and also hides information regarding the properties of the contents of the mass storage device. Other methods of managing data for the mass storage device are also possible.

Method 500 concludes at block 599. Aspects of method 500 may provide performance or efficiency benefits for data management for a mass storage device. For example, aspects of method 500 may have positive impacts with respect to information security. In embodiments, the structuring, the sensing, the detecting, the determining, and the providing (and other operational steps in embodiments) described herein may each occur in an automated fashion without user intervention. Altogether, determining a set of selected permissions to the encrypted file system of a storage device based on a token corresponding with a computing device may be associated with performance or efficiency benefits (e.g., speed, flexibility, responsiveness, high availability, resource usage, productivity).

Figure 6:
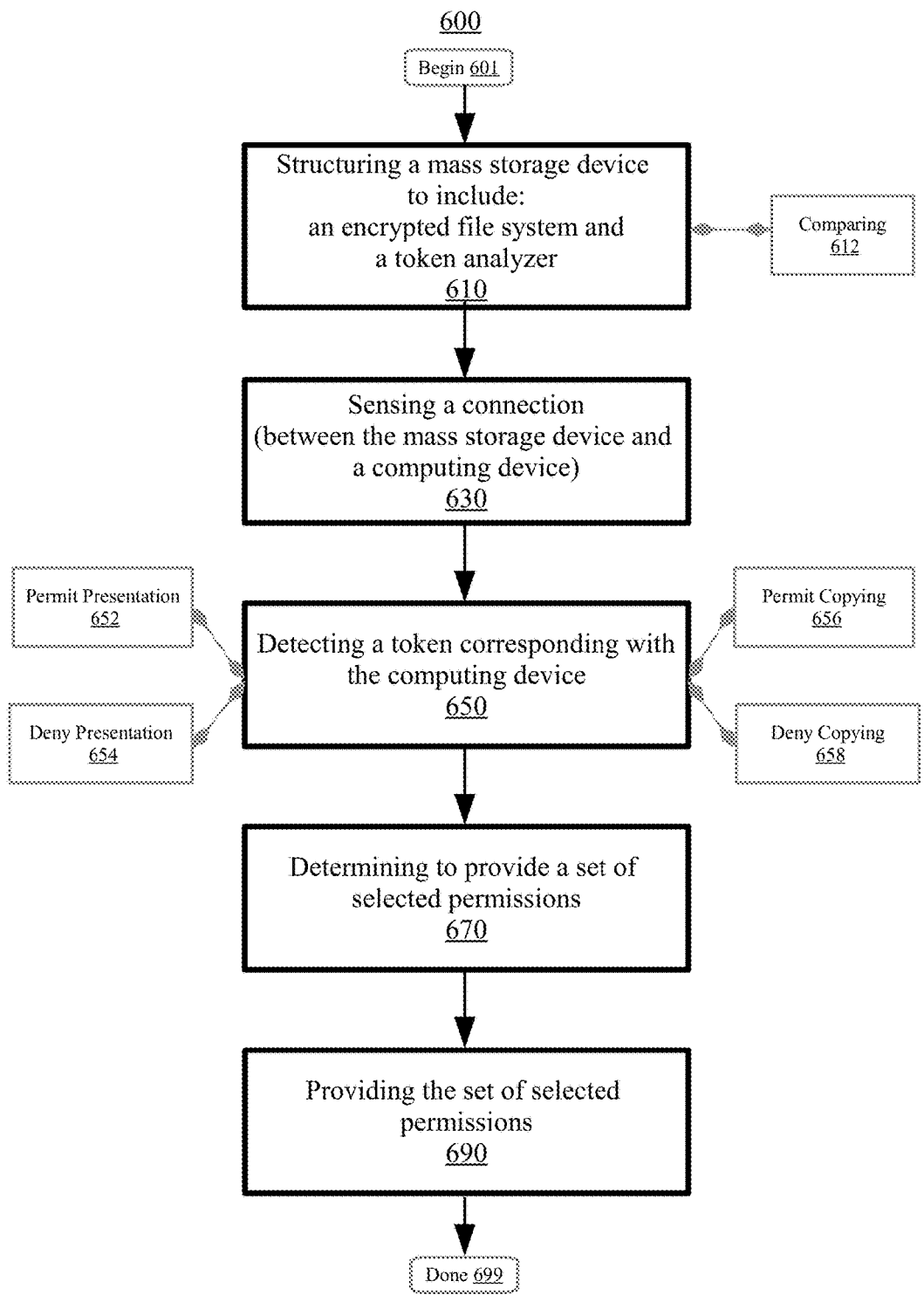
FIG. 6 is a flowchart illustrating a method for managing data for a mass storage device, according to embodiments.

FIG. 6 is a flowchart illustrating a method 600 for managing data for a mass storage device. Aspects of method 600 relate to using a token to manage access to the mass storage device. At block 610, a mass storage device may be structured to include an encrypted file system and a token analyzer. At block 630, a connection between the mass storage device and a computing device may be sensed. At block 650, a token corresponding with the computing device may be detected. At block 670, a set of selected permissions may be determined. At block 690, the set of selected permissions may be provided. Aspects of the method 600 may substantially correspond to other embodiments described herein, including FIGS. 1-6. The method 600 may begin at block 601.

In embodiments, the token may be compared with a set of generated tokens on the mass storage device at block 612. The token may be compared with a set of generated tokens by the token analyzer. Generally, comparing can include contrasting, correlating, juxtaposing, matching, evaluating, or otherwise examining the token with the set of generated tokens on the mass storage device. As described herein, comparing the token with the set of generated tokens may be used for determining a match or mismatch between one or more tokens (e.g., a first token and a second token). In embodiments, the set of generated tokens may include a token database, index, or directory to maintain one or more tokens created by the token analyzer and one or more users. The token database may include data entries for each token, as well as the chosen permissions associated with each token. For instance, a token of "KDCI8385" may be associated with a chosen permission of "read-access" for a first file of the mass storage device. In embodiments, the token database may also include information regarding the status of each token. For instance, a first token may be associated with a status of "master token," (e.g., a token associated with master access to the mass storage device) while a second token may be associated with a status of "standard token." As described herein, the token database may be used to compare one or more tokens with the set of generated tokens. As an example, in response to receiving a token of "KDCI8385," the token analyzer may examine the token with respect to the token database to determine whether the token matches a token of the set of generated tokens. Accordingly, in response to determining a match for the token, the chosen permission of "read-access" for the first file may be provided. Other methods of comparing the token with the set of generated tokens are also possible.

In embodiments, the set of selected permissions may include permitting presentation of a set of metadata at block 652. Permitting presentation of the set of metadata may be based on the token. Generally, permitting can include admitting, granting, or otherwise allowing presentation of the set of metadata. In embodiments, permitting presentation of the set of metadata may include allowing metadata related to a set of attributes of the mass storage device to be displayed using a computing device. The set of attributes may include data such as the total/used amount of storage space of the mass storage device, the number of files on the mass storage device, the type of files on the mass storage device (e.g., file format), file creation/edit dates, file sizes, file authors, and the like. As an example, in response to verifying a token, a set of metadata for a mass storage device that indicates available storage space of 298 gigabytes and 3 image files may be displayed. In embodiments, the set of selected permissions may include denying presentation of the set of metadata at block 654. Generally, denying can include preventing, disabling, restricting, limiting, or forbidding viewing or usage permissions with respect to the set of metadata. In embodiments, denying presentation of the set of metadata may include hiding attribute information for the mass storage device. As an example, in response to failing to verify a token, attribute information regarding the number of files on the mass storage device may be concealed with respect to a computing device. Other methods of permitting and denying presentation of the set of metadata are also possible.

In embodiments, the set of selected permissions may include permitting copying a first subset of the set of data from the mass storage device to the computing device at block 656. Permitting copying a first subset of the set of data may be based on a token. Generally, permitting can include admitting, granting, or otherwise allowing replication, duplication, or other movement of the first subset of the set of data. In embodiments, permitting copying a first subset of the set of data may allow for a user to reproduce or move contents from the mass storage device to the computing device. As an example, a folder including one or more files may be transferred from the encrypted file system of the mass storage device to an internal storage device of the computing system. In embodiments, the set of selected permissions may include denying copying a first subset of the set of data from the mass storage device to the computing device at block 658. Generally, denying can include preventing, disabling, restricting, limiting, or forbidding viewing or usage permissions with respect copying or movement of the first subset of the set of data. In embodiments, denying can include disabling data management operations including a copy function, a paste function, a transfer function, a share function, or the like. Other methods of permitting and denying copying of data on the mass storage device are also possible.

Method 600 concludes at block 699. Aspects of method 600 may provide performance or efficiency benefits for data management for a mass storage device. For example, aspects of method 600 may have positive impacts with respect to information security. In embodiments, the structuring, the sensing, the detecting, the determining, and the providing (and other operational steps in embodiments) described herein may each occur in an automated fashion without user intervention. Altogether, determining a set of selected permissions to the encrypted file system of a storage device based on a token corresponding with a computing device may be associated with performance or efficiency benefits (e.g., speed, flexibility, responsiveness, high availability, resource usage, productivity).

As described herein, access authentication for a mass storage device may provide benefits as compared with data transmission via digital communication. Accordingly, in certain embodiments, disclosed aspects relates to a self-contained system on the mass storage device (e.g., the tokens and necessary authentication applications can be managed and stored by the mass storage device itself). Aspects described herein can operate with one or more tokens. Aspects of the disclosure may provides a fine-grained layer of control. For example, a first user (e.g., user who structured the mass storage device) can select which permissions are associated with what tokens in order to designate what files can be accessed by which users (e.g., or to what degree the files can be accessed).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A security enabled mass storage device, comprising:
a microprocessor;
an encrypted file system to store a set of data; and an integrated token analyzer that manages access to the encrypted file system by:
structuring the mass storage device to include an encrypted file system to store a set of data, and a token analyzer to manage access to the encrypted file system, the structuring comprising:
connecting the mass storage device with an original computer, wherein an application for initialization runs automatically and configures a master token for the mass storage device, wherein the mass storage device is one of a portable device or a non-removable device;
detecting, in response to connecting the mass storage device with the original computer, the master token corresponding with the original computer having a first user; and
associating, in response to detecting the master token, the master token with the mass storage device including both the encrypted file system to store the set of data and the token analyzer to manage access to the encrypted file system; and
sensing, between the mass storage device and a computing device, a new connection;
detecting, in response to sensing the new connection, a token corresponding to a user of the computing device;
authorizing, based on the token, the user of the computing device with a set of selected permissions to the encrypted file system; and
providing, by the mass storage device to the computing device, a set of files according to the set of selected permissions to the encrypted file system.

2. A computer-implemented method of data management for a mass storage device, the method comprising:
structuring the mass storage device to include an encrypted file system to store a set of data, and a token analyzer to manage access to the encrypted file system, the structuring comprising:
connecting the mass storage device with an original computer, wherein an application for initialization runs automatically and configures a master token for the mass storage device, wherein the mass storage device is one of a portable device or a non-removable device;
detecting, in response to connecting the mass storage device with the original computer, the master token corresponding with the original computer having a first user; and
associating, in response to detecting the master token, the master token with the mass storage device including both the encrypted file system to store the set of data and the token analyzer to manage access to the encrypted file system; and
sensing, between the mass storage device and a computing device, a connection;
detecting, in response to sensing the connection, a first token corresponding with the computing device;
determining, by the token analyzer based on the first token, to provide the computing device a set of selected permissions to the encrypted file system; and
providing, by the mass storage device to the computing device, the set of selected permissions to the encrypted file system.

3. The method of claim 2, wherein the set of selected permissions:
allows, based on the first token, access to a first subset of the set of data, and
prevents, based on the first token, access to a second subset of the set of data.

4. The method of claim 3, wherein the set of selected permissions:
allows, based on the first token, read-access to the first subset of the set of data, and
prevents, based on the first token, write-access to the first subset of the set of data.

5. The method of claim 3, wherein the set of selected permissions:
hides, based on the first token, the second subset of the set of data.

6. The method of claim 3, wherein the mass storage device is of a USB mass storage device class, wherein a first file includes the first subset of the set data, wherein a second file includes the second subset of the set of data, and wherein the first file differs from the second file.

7. The method of claim 2, wherein the set of selected permissions:
allows, based on the first token, write-access to the encrypted file system.

8. The method of claim 7, wherein the set of selected permissions:
prevents, based on the first token, write-access to the set of data.

9. The method of claim 2, wherein the set of selected permissions:
allows, based on the first token, master-access to the mass storage device.

10. The method of claim 2, wherein the first token is selected from the group consisting of:
an access token; and
a security token.

11. The method of claim 2, wherein structuring the mass storage device includes:
  generating, by the application based on a chosen permission selected for a first subset of the set of data by the first user, the first token for the first subset of the set of data to indicate the chosen permission.

12. The method of claim 11, wherein generating the first token for the first subset of the set of data to indicate the chosen permission includes;
  selecting, for the first subset of the set data, a first chosen permission which is selected from the group consisting of:
    a read-access permission, and
    a write-access permission; and
  constructing, based on the first subset of the set data and the first chosen permission, the first token for the first subset of the set of data, wherein the first token includes an alphanumeric string of characters for authenticating the first chosen permission.

13. The method of claim 11, wherein:
  the computing device has a second user;
    detecting, in response to sensing the connection, the first token corresponding with the computing device includes:
      the application running automatically and prompting the second user for the first token; and
      receiving a second token from the second user, wherein the first token includes the second token;
    determining, by the token analyzer based on the first token, to provide the computing device a set of selected permissions to the encrypted file system includes:
      determining, by the token analyzer, that the second token matches the first token; and
      determining, based on the second token matching the first token, to provide the computing device having the second user with the chosen permission for the first subset of the set of data; and
    providing, by the mass storage device to the computing device, the set of selected permissions to the encrypted file system includes:
      allowing, with respect to the computing device having the second user, access to the first subset of the set of data according to the chosen permission.

14. The method of claim 11, wherein:
  the computing device has a second user;
  detecting, in response to sensing the connection, the first token corresponding with the computing device includes:
    the application running automatically and prompting the second user for the token; and receiving a second token from the second user, wherein the first token includes the second token;
  determining, by the token analyzer based on the token, to provide the computing device a set of selected permissions to the encrypted file system includes:
    determining, by the token analyzer, that the second token mismatches the first token; and
    determining, based on the second token mismatching the first token, to deny the computing device having the second user with the chosen permission for the first subset of the set of data; and
  providing, by the mass storage device to the computing device, the set of selected permissions to the encrypted file system includes:
    preventing, with respect to the computing device having the second user, access to the first subset of the set of data; and
    hiding, with respect to the computing device having the second user, the first subset of the set of data.

15. The method of claim 2, wherein the token analyzer:
  compares the first token with a set of generated tokens on the mass storage device.

16. The method of claim 2, wherein the set of selected permissions at least one of:
  permits, based on the first token, presentation of a set of metadata related to a set of attributes of the mass storage device; or
  denies, based on the first token, presentation of the set of metadata related to the set of attributes of the mass storage device.

17. The method of claim 2, wherein the set of selected permissions at least one of:
  permits, based on the first token, copying a first subset of the set of data from the mass storage device to the computing device, or
  denies, based on the first token, copying a second subset of the set of data from the mass storage device to the computing device.

18. A computer program product for data management for a mass storage device, the computer program product comprising a computer readable storage medium having program instructions embodied therewith, wherein the computer readable storage medium is not a transitory signal per se, the program instructions executable by a processor to cause the processor to perform a method comprising:
  structuring the mass storage device to include an encrypted file system to store a set of data, and a token analyzer to manage access to the encrypted file system, the structuring comprising:
    connecting the mass storage device with an original computer, wherein an application for initialization runs automatically and configures a master token for the mass storage device, wherein the mass storage device is one of a portable device or a non-removable device;
    detecting, in response to connecting the mass storage device with the original computer, the master token corresponding with the original computer having a first user; and
  associating, in response to detecting the master token, the master token with the mass storage device including both the encrypted file system to store the set of data and the token analyzer to manage access to the encrypted file system; and
  sensing, between the mass storage device and a computing device, a connection;
  detecting, in response to sensing the connection, a token corresponding with the computing device;
  determining, by the token analyzer based on the token, to provide the computing device a set of selected permissions to the encrypted file system; and
  providing, by the mass storage device to the computing device, the set of selected permissions to the encrypted file system.

19. The computer product of claim 18, wherein at least on of:
  the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to a remote data processing system for use in a computer readable storage medium with the remote data processing system.

* * * * *